Oct. 7, 1958     J. A. ROSS     2,854,942

GARAGE INDICATOR TO AVOID AUTOMOBILE OVERSHOOTING

Filed Aug. 27, 1956

INVENTOR.
John A. Ross

BY
Thos. E. Scofield
ATTORNEY.

United States Patent Office 2,854,942
Patented Oct. 7, 1958

2,854,942

GARAGE INDICATOR TO AVOID AUTOMOBILE OVERSHOOTING

John A. Ross, Kansas City, Mo.

Application August 27, 1956, Serial No. 606,264

5 Claims. (Cl. 116—28)

This invention relates to indicating means employed in automobile garages to avoid overshooting of the automobile in the garage and to aid in proper positioning of the car in the garage, the invention relating more specifically to a combination visual and contact warning device suspended from the ceiling of the garage and operable to contact the windshield of the automobile when it is properly positioned in the garage.

Previously many types of signaling and warning devices have been provided for avoiding overshooting of cars in garages and aiding in the proper positioning of cars therein. There are a number of objections to the previously available devices. In the first place, such devices have been complicated, expensive and difficult to manufacture. In the second place, such warning devices have generally been either positioned adjacent the side of the garage or the end of the garage, attached either to the garage walls or the floor thereof. In such conventional devices, a great deal of space is taken up within the garage, which space is often very dear for storage and the like. Additionally, often such devices are not adaptable to all types and forms of garages. Thirdly, often such conventional warning devices may be damaged if the automobile overshoots its desired position in the garage and replacement of the warning devices is required. Fourthly, most of such devices are contact devices which give a signal when the bumper or other part of the automobile contacts the device. This type of device is time-consuming as the operator of the vehicle has to inch carefully up to the device to avoid running into it or damaging it. By the time this is done, the operator could probably have positioned the automobile in the garage without the aid of the device. If the warning device is a signal device, generally the signaling means is positioned out of the normal line of sight directly forward over the hood of the automobile and thus the driver has to turn his eyes from the approaching rear wall of the garage to look at the indicator. This arrangement offers its own hazards. Finally, most such warning devices do not provide both for longitudinal and lateral adjustment of the car within the garage.

Therefore, an object of the invention is to provide an effective warning device to aid in positioning automobiles in garages and to avoid overshooting of the car in the garage.

Another object of the invention is to provide an effective warning device for automobiles in garages which occupies a minimum amount of garage space and absolutely no garage floor space.

Another object of the invention is to provide an effective warning device for automobiles in garages which is simple in construction, easy to manufacture, and extremely cheap.

Another object of the invention is to provide a visual warning device for automobiles in garages, the device always being in view of the driver and not requiring the removal of the driver's line of sight from directly ahead of him as the car enters the garage.

Another object of the invention is to provide a combination visual and contact warning device for automobiles entering garages which permits both longitudinal and lateral precise positioning of the car in the garage.

Another object of the invention is to provide a combination visual and contact warning device for positioning automobiles in garages which offers absolutely no danger to the car or the warning device itself if the car is laterally out of position or if it overshoots the desired longitudinal position of the car in the garage.

Another object of the invention is to provide an effective warning device for automobiles in garages which is easily installed, and easily varied vertically or horizontally in the garage to accommodate any type of automobile or size of garage.

Another object of the invention is to provide an effective warning device for automobiles in garages which is a combination visual and contact warning device and which is visible in the absence of light.

Another object of the invention is to provide an effective visual and contact combination warning device for automobiles in garages which has provision thereon for advertising indicia or other information, the warning device always being presented directly in front of the motorist's eyes when the car enters the garage, the device, however, not interfering in any way with the maneuvering of the car in the garage.

Another object of the invention is to provide an effective warning device for the positioning of automobiles in garages, the device receiving a very minimum of wear from use and possessing an extremely long operational life.

Other and further objects of the invention will appear in the course of the following description thereof.

In the drawings, which form a part of the instant invention and are to be read in conjunction therewith, an embodiment of the invention is shown, and in the various views, like numerals are employed to indicate like parts.

Figure 1:
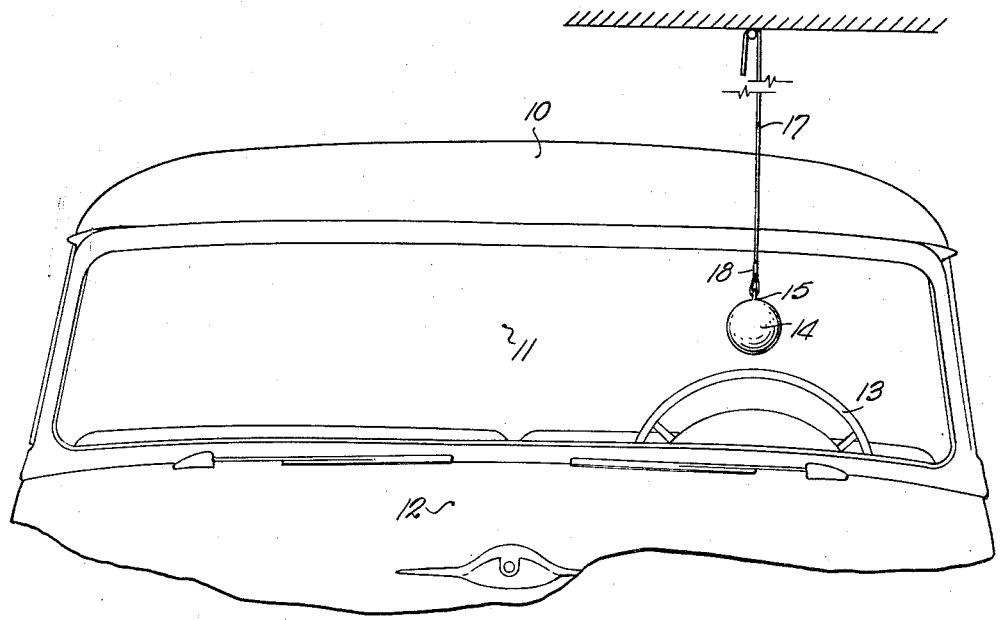
Fig. 1 is a front view of an automobile parked in a garage and properly positioned therein with the warning device directly positioned in front of the driver's seat.
Figure 3:
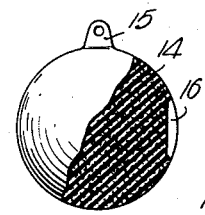
Fig. 3 is a side view with a portion thereof in section of the inventive automobile warning device.
Figure 2:
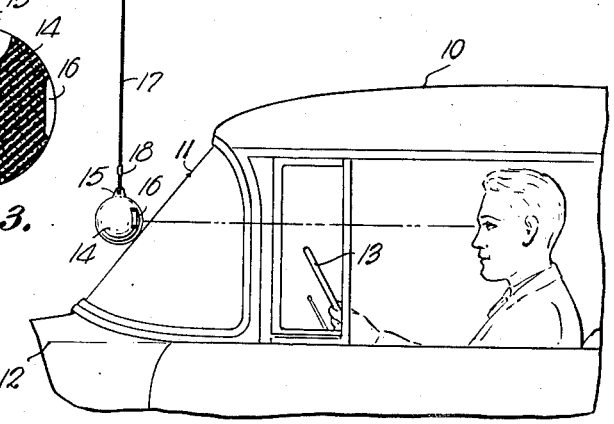
Fig. 2 is a side view of an automobile positioned in a garage properly with the warning device in contact with the windshield of the automobile.
Figure 6:
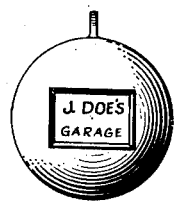
Fig. 6 is a side view of a modified form of the inventive warning device showing a flattened portion for indicia.

Referring to Fig. 1, at 10 is shown a conventional automobile having a windshield 11, a hood 12, and a steering wheel 13. The automobile 10 is shown as properly and precisely positioned within a conventional garage (not shown in detail). The inventive warning device for automobiles is shown as positioned directly in front of the driver's position in the car, and in front of the steering wheel, thereby indicating that the car is properly positioned both laterally and longitudinally in the garage. The warning device comprises an object adaptable to be suspended from the garage ceiling and means for suspending the object from the garage ceiling at any desired distance therefrom. The object shown in Fig. 3 comprises a resilient solid ball 14 of rubber, plastic, or like material, preferably fairly light, the ball 14 having an engaging loop or fitting 15 fixed to the top portion thereof. The preferred form of the ball is shown in Fig. 3 and preferably has a small inwardly formed panel 16 recessed below the surface of the ball to receive information of any type desired or advertising indicia. The means for suspending the ball from the ceiling as shown comprises a string or cord 17 passing through the loop 15 and attached to itself by sleeve 18. The suspending means may be any desired material or form such as a chain, cable, wire, rope or string. Even a rod, provided it is resiliently and flexibly attached to the ceiling so the ball may move horizontally, would be satisfactory. The string or suspending means 17 may be fixed to the garage ceiling by any conventional means such as tying to a staple, a nail, or any conventional type of fitting. The necessity of the suspending means being yieldable or resilient derives from the fact that should the car overshoot the garage for some reason or another, when the windshield strikes the object 14, it should retreat therebefore if the car motion continues. While the suspending object is shown as a ball, it is obvious that any form of object of any geometrical shape or material is satisfactory provided the mass is not too great so as to endanger the windshield of the car.

The panel 16 is preferably on the side of the object which is adjacent the windshield so that the panel is at all times exposed to the driver's view. The purpose of the panel is to perform an advertising or an informing function to provide the name, address and telephone number, if desired, of a convenient garage or a general advertiser. The purpose of recessing the panel in the surface of the ball is to avoid the indicia wearing off over the period of a long time of use. It is contemplated that the warning device have an extremely long life as there is no wear contemplated except in the contact with the windshield. The suspending means 17 should be variable in length so as to accommodate various types and heights of automobiles. The suspending means should be of the type easily transferable to another position on the roof of the garage also to accommodate various types and forms of automobiles.

It is especially desirable that the object be either painted with a luminous paint or made luminous in some manner so as to be operable in the absence of light. As the object is preferably positioned to strike the windshield on the driver's side thereof at preferably the eye level of an average driver, or the eye level of the driver-user of the garage, there is no need for the driver ever to remove his line of vision from directly ahead.

Figure 4:
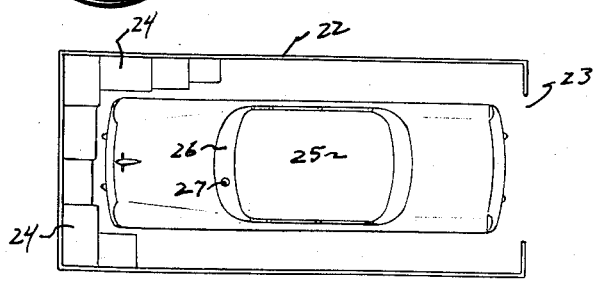
Fig. 4 is a top view of a garage having materials stored at the closed end and sides thereof illustrating how the inventive warning device permits precise positioning of a car in a crowded garage.

In Fig. 4 is shown a modified form of resilient object 19, the object comprising a resilient walled, hollow ball having a hollow center 20 and suspending eyelet 21. Advertising indicia may be painted on the outside surface of this object or, like the modification of Fig. 3, a panel may be released in the side thereof.

Figure 5:
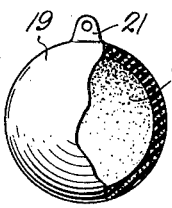
Fig. 5 is a side view with a portion thereof in section of a modified form of the inventive warning device.

Fig. 5 shows a garage 22 having entry 23 and piled stored materials 24 at the closed end thereof. Car 25 with windshield 26 has been driven so the warning device 27 contacts the latter centrally of the driver's position. Car 25 is thus correctly positioned in garage 22 not contacting material 24.

In operation, the owner of the garage positions the car in the garage at the precise position desired. He may then fix the object 14 by means of suspending means 17 to the ceiling or roof of the garage so that it hangs with the front side of the object with panel 16 resting in contact on the windshield centered on the driver's side at the eye level of the driver. The suspending means is then fixed to the roof or ceiling of the garage and the object is ready for use.

When the car approaches the garage, the object is easily visible suspended in space. If at night, or, if the garage is normally very dark, the object may be painted with luminous paint so as to be clearly visible. The driver merely moves the car forwardly with the object directly in front of him to position the car properly laterally in the garage. When the object nears and contacts the windshield, the driver knows the car is positioned properly longitudinally. Should the owner of the garage change models, makes or types of cars, he may always employ the same positioning device by merely varying the height of the object from the floor of the garage to properly strike the windshield of the car and moving the suspending means laterally in any direction desired or longitudinally to compensate for changes in the length of the car. Since the object is suspended from the ceiling in an area of the garage not normally used for anything except car storage, there is no problem of interference with walking around in the garage and, even if one should walk into the object it swings easily and lightly out of the way and its relatively low mass prevents injury.

Thus it may be seen that a device has been provided which accomplishes all of the objects and ends hereinbefore set forth together with other advantages which are obvious and which are inherent to the device.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. In combination with an automobile garage and an automobile properly parked therein, a ball-like warning device in contact with the windshield of said automobile in alignment with the driver's position and at substantially eye-level thereof, and yieldable suspending means operatively connected to said device.

2. Apparatus as in claim 1 wherein the ball-like warning device comprises a solid resilient mass of relatively low mass per unit volume.

3. Apparatus as in claim 1 wherein the ball-like warning device has an indicia receiving recess in the side thereof next the automobile windshield.

4. Apparatus as in claim 1 including an eyelet on the ball-like warning device with which said suspending means is engaged.

5. Apparatus as in claim 1 wherein said ball-like warning device is hollow.

References Cited in the file of this patent

UNITED STATES PATENTS

| | | |
|---|---|---|
| 1,981,188 | Pravitt | Nov. 20, 1934 |
| 2,122,253 | Humphreys | June 28, 1938 |
| 2,658,467 | Trapani | Nov. 10, 1953 |
| 2,706,462 | Evans | Apr. 19, 1955 |